UNITED STATES PATENT OFFICE.

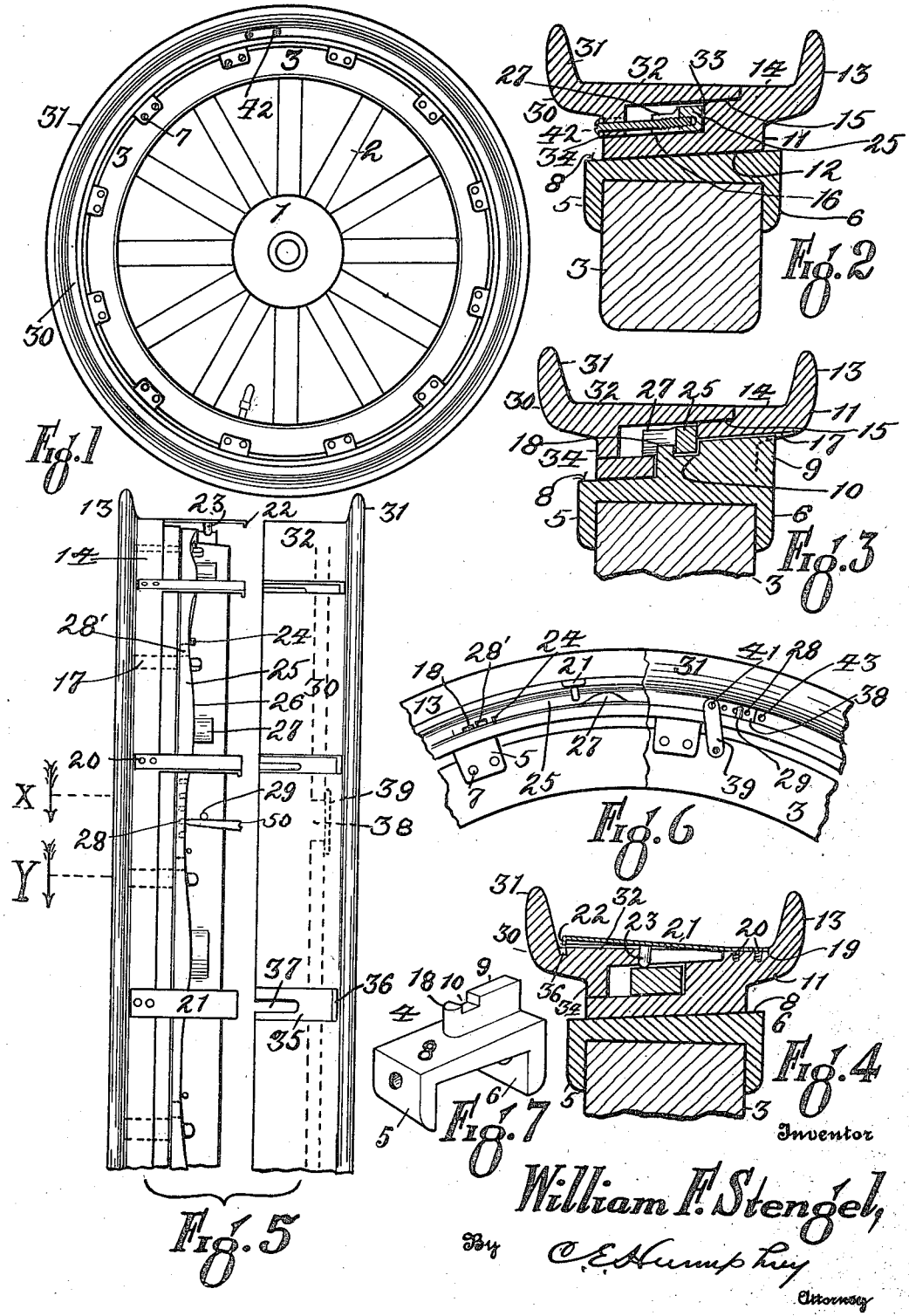

WILLIAM F. STENGEL, OF AKRON, OHIO, ASSIGNOR OF ONE-HALF TO JOHN BENKER, OF AKRON, OHIO.

VEHICLE WHEEL-RIM.

1,154,216.　　　　　Specification of Letters Patent.　　Patented Sept. 21, 1915.

Application filed April 30, 1915. Serial No. 24,915.

*To all whom it may concern:*

Be it known that I, WILLIAM F. STENGEL, a citizen of the United States, residing at Akron, in the county of Summit and State of Ohio, have invented new and useful Improvements in Vehicle Wheel-Rims, of which the following is a specification.

This invention relates to improvements in vehicle wheel rims for holding elastic tires, and the object thereof is to provide a rim suitable for holding an elastic tire and from which the tire can be easily removed, and at the same time, provide a rim which can be removed bodily from a vehicle wheel with the tire thereon and replaced with a minimum amount of labor and in a remarkably short period of time.

More particularly, the invention contemplates the provision of a rim comprising two members capable of lateral separation one from the other, which when assembled constitutes a seat for an elastic tire and which can be removed while in its assembled condition bodily from the wheel on which it is mounted, thereby constituting what is known in the trade as a demountable rim.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of a conventional type of vehicle wheel with a rim embodying this invention in position thereon; Fig. 2, is a transverse sectional view of the outer portion of a vehicle wheel with a rim embodying this invention positioned thereon and taken approximately on line X of Fig. 5. Fig. 3, is a view similar to Fig. 5 taken approximately on line Y of Fig. 5; Fig. 4, is a view similar to Fig. 2 with the coupling means in their inoperative position; Fig. 5, is a plan view in side elevation of a rim embodying this invention with the two members thereof arranged in spaced relation so as to better illustrate the details of construction; Fig. 6, is a view enlarged partly in side elevation with portions thereof broken away to better illustrate the construction of the device; and, Fig. 7, is a perspective view enlarged of a wedge-shaped lug employed for mounting the rim.

Referring to the drawings in detail the reference numeral 1 denotes the hub of an ordinary vehicle wheel provided with spokes 2 on which is a felly 3 preferably provided with a flat cylindrical periphery. Mounted on the peripheral portion of the felly 3 are a plurality of wedge-shaped lugs 4, each of which embodies end flanges 5 and 6 adapted to lap the side faces of the felly and be retained in position through the medium of holding members, such, for instance, as screws or bolts 7. The outer faces 8 of these lugs are inclined and are provided with transversely and outwardly-extending narrow projections 9 through which extend notches 10. These lugs are equally spaced from each other on the peripheral portion of the felly 3 with the projections 9 in parallelism and the notches 10 in circumferential alinement. The number of lugs 4 employed on a wheel will depend considerably on the diameter thereof and also considerably on the work to which the wheel is to be subjected, but the number of these lugs is immaterial, so long as a sufficient number of them are provided to properly sustain the rim which is to be mounted thereon.

Adapted to be seated on the inclined outer faces of the lugs 4 is a rim comprising a pair of coöperating complemental members. One of these members 11 embodies a ring the inner face 12 of which is inclined and adapted to seat on the outer inclined faces of the lugs 4 when the member 11 is shifted laterally to the right in Figs. 2, 3 and 4. This member 11 is provided with an outwardly-projecting tire-engaging flange 13 of conventional pattern and an outer cylindrical face 14 forming a part of a tire seat. This member 11 is further provided with a circumferentially rabbeted portion 15 for a purpose to be later described. Extending from the rabbeted portion 15 is a second rabbeted portion 16 the inner face of which is frusto-conically-formed. The inner portion of the member 11 is provided with a series of transversely-extending slots 17 (see Fig. 3) which are properly arranged to receive the projections 9 of the members 4. These slots 17 extend through the inner portions of the member 11 and communicate with the space inclosed by the inner rabbet 16 so that when the member 11 is positioned the portions 18 (see Fig. 7) of the projections 9 will lie in spaced relation with respect to the wall of the rabbeted portion 16 and one of the side walls of each of the notches 10 will be in alinement with this vertical wall of the rabbet 16 as shown in Fig. 3. The outer face of the tire seat 14 of the member 11 is provided with a plurality of transversely-extending shallow recesses 19 in each of which is secured, by holding means 20, a spring coupling member 21 the outer end of which is fashioned into a hook 22 and is further provided with an inwardly-projecting stud 23. These coupling members 21 are equal in thickness to the depth of the recesses 19 so that the outer faces of the members 21 will lie flush with the tire-seat 14. The outer and inclined face of the rabbet 16 is provided with a series of outwardly-projecting guide pins 24 arranged in parallelism with and in spaced relation to the lateral wall of the rabbet 16, the space between them and the lateral wall constituting a channel. Mounted in the channel just described is a circumferentially-shiftable locking and releasing ring 25, one of the faces of which abuts against the lateral wall of the rabbet 16 and is fashioned for snug engagement therewith. The opposite face of the ring is sinuously formed with a plurality of circumferentially-inclined wedge-shaped portions 26 arranged at intervals, the intervals corresponding in number and position to the projections 9. This ring is further provided with a plurality of laterally-projecting integrally-formed lugs 27, the outer faces of which are convex. The number of lugs 27 is equal to the number of coupling members 21 and they are so positioned that when the ring 25 is shifted circumferentially on its seat in the channel the lugs 27 will engage the inwardly-projecting studs 23 and force them outwardly and raise the outer hooked ends 22 of the coupling members 21. The sinuous face of the ring 25 is provided with a plurality of transversely-extending threaded recesses 28 for a purpose to be later described. The ring 25 is further provided with a plurality of transversely-extending grooves 28' for a purpose to be later described. The outer face of the inclined wall of the rabbet 16 is transversely opposite to the normal position of the recesses 28 is provided with a projecting pin 29, constituting a fulcrum for a purpose to be described.

The complementary member of the rim designated generally by the reference numeral 30 is provided with an outwardly-projecting tire-engaging flange 31 coöperating with the flange 13 for holding the tire and of conventional pattern and the outer face 32 of this member constitutes a portion of a tire-seat. The inner face of the member 30 is frusto-conically-formed and adapted to be received in the rabbet 15 and to abut against the lateral wall thereof for completing the rim when the two are in assembled relation. The inner portion of the member 30 is further provided with an inwardly-projecting flange 34 (see Fig. 3) adapted to rest on the frusto-conically-formed outer face of the rabbet 16 so that the main portion of the member 30 is somewhat in the shape of an L in cross section. The outer face of the member 30 is provided with a series of shallow recesses 35 equal in number, position and arrangement to the coupling members 21, and of suitable size to receive the free ends of the same and these recesses 35 communicate near the flange 31 with deeper recesses 36 arranged to receive the hooks 22 at the ends of the coupling members. Centrally of each recess 35 is a slot 37 of sufficient width to freely receive the inwardly-projecting studs 21. The side flange 34 of the member 30 is also provided with a transverse aperture 38 adapted to be normally closed by a cover 39 secured in position by a short holding member 40 at one end and at the other end by a longer holding member such as a screw 42 passed through an aperture 43 in the rim 34 of the member 30. The recess 38 under normal conditions is positioned immediately opposite the recesses 28 in the ring 25 and the pin 29, as clearly seen in Fig. 6. The holding member 43 is of sufficient length to extend into and engage in one of the recesses 28 which are threaded for this purpose.

In assembling a vehicle wheel embodying this invention the ring 25 is seated in position by alining the notches 28' with the pins 24 and forcing the ring 25 laterally into the channel, before described, after which the ring is given a circumferential motion sufficient to bring the notches 28' into alinement with the transverse notches 17 in the member 11. This operation locks the ring 25 in position and effectually couples it to the member 11 by bringing the notches 28' out of registration with the pins 24. The member 11 is then positioned by alining the notches 17 with the projections 9 on the members 4 and it is then shifted laterally until its inner inclined face seats on the outer inclined faces 8 of the members 4. The ring 25 is then given a circumferential movement, causing the wedge-shaped portions 26 to engage the side walls of the projections 18 of the projections 9 which effectually locks the member 11 in position and couples this member to the wheel. This circumferential movement of the ring 25 moves the notches 28' of the ring 25 out of registration with the ends 18 of the projections 9 as well as out of registration with the pins 24. The complementary member 30 is then arranged with the recesses 37 in alinement with the coupling members 21 and is forced laterally to place during which operation the studs 23 pass through the slots 37 and when the member 30 is seated the hooks 22 of the coupling members 21 seat in the recesses 36 at the ends of the recesses 35. The cover 39 is then positioned and the holding member 42 passed through the cover 39 and the opening 43 in the flange 34 of the member 30 engaging the threads in one of the recesses 28 in the ring 25, which locks the latter from circumferential movement.

If it is desired to remove the entire rim with its tire equipment mounted thereon as an entirety the holding member 42 is removed, the cover 39 swung to the position shown in Fig. 6, and a tool such as a lever 50 (see Fig. 5) is passed through the opening 38 and inserted in one of the recesses 28 and then is manipulated using the pin 29 as a fulcrum and the ring 25 is shifted circumferentially until the notches 28' are in alinement with the ends 18 of the projections 9 which releases the entire rim with its tire equipment which may be slid laterally off from the members 4. If, however, it is desired simply to remove the tire, leaving the member 11 in position, the lever 50 is used to shift the ring 25 until the convex lugs 27 engage the studs 23 on the coupling members 21 which operation raises the hooks 22 at the ends of the coupling members out of the recesses 36, thereby uncoupling the member 30 from the member 11, thereby permitting the former to withdraw laterally. Of course, it will be obvious that this latter operation may take place or may be accomplished when the entire rim is mounted on the wheel or when the rim itself has been removed from the wheel when it is then desired to separate the two portions of the rim one from the other.

I claim:—

1. A vehicle wheel rim comprising a pair of members overlapping each other horizontally and spaced radially apart to provide an annular recess between them, said members capable of lateral separation, coupling members carried by one member and engaging the other member for holding said rim members in assembled relation, a circumferentially-movable ring arranged in said annular recess and adapted when shifted to release said coupling members for permitting separation of the parts of the rim.

2. A vehicle wheel rim comprising two parts, one adapted to telescope the other, the opposing walls of the two members being spaced apart radially to provide an annular recess between them, said members capable of being laterally separated, a plurality of coupling members carried by one member and engaging the other member for holding said members in assembled relation, and a circumferentially-shiftable ring positioned in said recess and adapted to release said coupling members for permitting lateral movement of one member.

3. A vehicle wheel rim comprising a pair of members capable of being laterally separated, a plurality of coupling members carried by one portion of the rim and engaging the other for holding said rim members in assembled relation, an inwardly-projecting stud on each of said coupling members and a circumferentially-shiftable ring carried by one member and provided with lugs adapted to engage said studs when said ring is shifted in one direction for releasing said coupling to permit lateral separation of the rim members.

4. A vehicle wheel rim comprising a pair of rim members capable of being laterally separated, said members having overlapping portions adapted to be arranged in spaced relation to provide a circumferential channel, coupling members carried by one rim portion and engaging the other for holding the rim members in assembled relation, studs carried by said coupling members projecting into said channel, a circumferentially-shiftable ring mounted in said channel and provided with portions for engagement with studs whereby when said ring is shifted said coupling members are shifted to permit lateral separation of the ring members.

5. A vehicle wheel rim comprising a pair of rim-forming members having overlapping portions spaced apart to provide a circumferential channel, a plurality of coupling members on one rim member adapted to engage in recesses in the other member for coupling the two members together, a circumferentially-shiftable ring mounted in said channel provided with portions adapted to engage said coupling members to move them to their inoperative position, said ring provided with portions adapted to be engaged by a lever for shifting the same, and a fulcrum pin mounted on one rim member in juxtaposition to said last-named portion of said ring.

6. The combination with a wheel of a series of spaced transversely and outwardly-extending projections, said projections provided with circumferentially-alined notches, a rim-forming member provided with a circumferential shoulder and further provided with transverse slots adapted to receive the projections on said wheel, a ring mounted on said rim member provided with notches through which the projections on the wheel are arranged to pass, one side of said ring having on one face a series of inclined portions with the opposite side thereof smooth, said ring adapted to seat in the notches in said projections with the smooth side thereof engaging said shoulder as a guide and arranged when shifted circumferentially to interlock with said projections, the inclined portions of said ring arranged to set up a wedging-action between the projections and said shoulder, for shifting said rim-forming member laterally.

7. The combination with a wheel of a series of spaced transversely and outwardly-extending projections, said projections provided with circumferentially-alined notches, a rim-forming member provided with transverse slots adapted to receive the projections on said wheel, a ring mounted on said rim member provided with notches through which the projections on the wheel are arranged to pass, one side of said ring having a series of inclined portions, said ring adapted to seat in the notches in said projections and arranged when shifted circumferentially to interlock therewith, the inclined portions of said ring arranged to set up a wedging-action for locking the said rim member on said wheel, a complemental rim-forming member, coupling members carried by one of said rim-forming members and engaging the other, and means on said ring for moving said coupling members to the inoperative position to permit lateral separation of said rim member.

8. The combination with a wheel of a series of spaced transversely and outwardly-extending projections, said projections provided with circumferentially-alined notches, a rim-forming member provided with transverse slots adapted to receive the projections on said wheel, a ring mounted on said rim member provided with notches through which the projections on the wheel are arranged to pass, one side of said ring having a series of inclined portions, said ring adapted to seat in the notches in said projections and arranged when shifted circumferentially to interlock therewith, the inclined portions of said ring arranged to set up a wedging-action for locking the said rim member on said wheel, a complemental rim member, coupling members carried by one of said rim members and adapted to engage the other rim member, inwardly-projecting studs on said coupling members, lugs carried by said ring and adapted when said ring is shifted to move said coupling members to their inoperative position to permit lateral separation of one rim member from the other.

9. The combination with a wheel of a series of spaced transversely and outwardly-extending projections, said projections provided with circumferentially-alined notches, a rim-forming member provided with transverse slots adapted to receive the projections on said wheel, a ring mounted on said rim member provided with notches through which the projections on the wheel are arranged to pass, one side of said ring having a series of inclined portions, said ring adapted to seat in the notches in said projections and arranged when shifted circumferentially to interlock therewith, the inclined portions of said ring arranged to set up a wedging action for locking the said rim member on said wheel, a complemental rim member, coupling members carried by one of said rim members and adapted to engage the other rim member, inwardly-projecting studs on said coupling members, lugs carried by said ring and adapted when said ring is shifted to move said coupling members to their inoperative position to permit lateral separation of one rim member from the other, one of said rim members provided with an opening in the lateral portion thereof to permit access to said ring for laterally shifting it.

In testimony whereof I have hereunto set my hand.

WILLIAM F. STENGEL.